United States Patent
Ide et al.

(10) Patent No.: US 7,348,749 B2
(45) Date of Patent: Mar. 25, 2008

(54) CONTROL DEVICE FOR SYNCHRONOUS MOTOR

(75) Inventors: Kozo Ide, Fukuoka (JP); Mitsujiro Sawamura, Fukuoka (JP); Toshihiro Sawa, Fukuoka (JP); Jun Oyama, Nagasaki (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 321 days.

(21) Appl. No.: 10/525,666

(22) PCT Filed: Aug. 25, 2003

(86) PCT No.: PCT/JP03/10710

§ 371 (c)(1),
(2), (4) Date: Feb. 25, 2005

(87) PCT Pub. No.: WO2004/021556

PCT Pub. Date: Mar. 11, 2004

(65) Prior Publication Data

US 2007/0069682 A1 Mar. 29, 2007

(30) Foreign Application Priority Data

Aug. 30, 2002 (JP) ............................. 2002-252617

(51) Int. Cl.
*G05B 11/28* (2006.01)

(52) U.S. Cl. ..................... 318/599; 318/811; 318/138; 318/439; 318/254

(58) Field of Classification Search ................ 318/727, 318/254, 439, 138, 599, 811
See application file for complete search history.

(56) References Cited

U.S. PATENT DOCUMENTS

| | | | | |
|---|---|---|---|---|
| 5,057,759 A | * | 10/1991 | Ueda et al. | 318/616 |
| 6,396,229 B1 | * | 5/2002 | Sakamoto et al. | 318/439 |
| 6,462,492 B1 | * | 10/2002 | Sakamoto et al. | 318/254 |
| 2001/0002784 A1 | * | 6/2001 | Masaki et al. | 318/727 |
| 2002/0163319 A1 | * | 11/2002 | Kaneko et al. | 318/727 |
| 2003/0020429 A1 | * | 1/2003 | Masaki et al. | 318/727 |

FOREIGN PATENT DOCUMENTS

| | | |
|---|---|---|
| JP | 2002-78391 A | 3/2002 |
| JP | 2003-52193 A | 2/2003 |

* cited by examiner

*Primary Examiner*—Rina I. Duda
(74) *Attorney, Agent, or Firm*—Sughrue Mion, PLLC

(57) ABSTRACT

A control device is provided for a synchronous motor, which drives the synchronous motor through a voltage operated PWM inverter and controls a torque and a speed of the motor, including a unit for causing a PWM carrier signal to have an arbitrary phase difference between two phases such UV, VW, or WU in three phases of U, V, and W, a unit for extracting a high frequency voltage and a high frequency current, which are thus generated from a detecting voltage or a command voltage and a detecting current, and a unit for estimating a position of a magnetic flux or position of a magnetic pole by using the high frequency voltage and the high frequency current which are excited.

14 Claims, 2 Drawing Sheets

CONTROL DEVICE FOR SYNCHRONOUS MOTOR

TECHNICAL FIELD

The present invention relates to a control device for an electric motor which serves to estimate the positions of a magnetic poles from a very low speed, including a zero speed, with high precision so as to control a torque and a speed based on the position of the magnetic pole thus estimated.

BACKGROUND ART

For a conventional magnetic pole estimating method, there has widely been used a method of calculating an induced voltage which is proportional to the speed of an electric motor based on an input voltage and a current of the electric motor and estimating a speed as reported in IEEE Paper D., Vol. 108, No. 12, 1988 "Method of Controlling Adaptive Current of Brushless DC motor having Parameter Identifying Function". Moreover, there has been proposed 1996 IEEE Industry Applications Society National Convention No. 170 "Zero Speed Torque Control of Salient-Pole Type Synchronous Motor using Sensorless System". According to this system, an AC signal is superposed on a voltage command value and a detecting current is subjected to an FFT analysis to detect a rotating speed of an electric motor and a position of a magnetic pole.

DISCLOSURE OF THE INVENTION

In the conventional art, however, an operation can be carried out with sufficient precision in a high speed area in a method of estimating the speed and position of a rotor based on the induced voltage of the motor, however, an accurate estimation cannot be carried out at a very low speed where less information is provided about an induced voltage. Therefore, there have been proposed some methods of injecting an AC signal into a motor, which is used for sensing but of which frequency is not related to a driving frequency itself. In this case, estimating the position of a rotor can be carried out based on a relationship between a voltage and a current. However, there is a problem in that an additional signal generator is required for injecting the sensing signal and its control is also complicated.

Therefore, it is an object of the invention to provide a control device for a synchronous motor which can cause the carrier signal of a PWM inverter to have an arbitrary phase difference between two of three phases of U, V and W, thereby generating a high frequency voltage and a high frequency current other than a driving frequency so that estimating the position of a magnetic pole can be carried out based on a relationship between the voltage and the current by the simplified control device without requiring a signal generator, and furthermore, this control device can also carry out a control from a zero speed.

In order to achieve the object, a first aspect of the invention is directed to a control device for a synchronous motor which drives the synchronous motor through a voltage-operated PWM inverter and controls a torque and a speed of the motor, comprising phase difference holding means for causing a PWM carrier signal to have an arbitrary phase difference between two phases such as UV, VW or WU in three phases of U, V and W, high frequency extracting means for extracting a high frequency voltage and a high frequency current which are thus generated from a detecting voltage or a command voltage and a detecting current, and means for estimating a position of a magnetic flux or a position of a magnetic pole by using said extracted high frequency voltage and said extracted high frequency current.

Moreover, a second aspect of the invention is directed to the control device for a synchronous motor according to the first aspect of the invention, wherein the phase difference holding means generates an arbitrary high frequency on a motor input voltage or current between the two phases such as UW, VW or WU of the inverter, said arbitrary high frequency being other than an output frequency of the voltage-operated PWM inverter.

Furthermore, a third aspect of the invention is directed to the control device for a synchronous motor according to the first or second aspect of the invention, wherein the high frequency extracting means converts the tree phases of the motor into a two-phase static coordinate system with α axis and β axis being orthogonal by 90 degrees from each other, in which the U phase of the three phases of the motor is set to be the α axis, and detects a voltage and a current having the arbitrary high frequency components on the α and β axes respectively so that only the arbitrary frequency components can be extracted by means of a band-pass filter.

In addition, a fourth aspect of the invention is directed to the control device for a synchronous motor according to any of the first to third aspects of the invention, wherein the A magnetic pole position estimating mean for estimating a position of a magnetic pole calculates cos 2θ and sin 2θ by means of a magnetic pole position estimator based on said extracted high frequency voltage component and said extracted current component to obtain a magnetic pole position θ by referring to a trigonometric function table.

Moreover, a fifth aspect of the invention is directed to the control device for a synchronous motor according to any of the first to fourth aspects of the invention, wherein the control device further comprises a current control device for isolating a detecting current into a directional component of the magnetic pole and a torque component by using the position estimated by the means for estimating a position of a magnetic pole, each being fed back to the current control device so as to control the current.

Furthermore, a sixth aspect of the invention is directed to the control device for a synchronous motor according to any of the first to fifth aspects of the invention, wherein the control device further comprises a speed estimating device for estimating a speed by using the position estimated by the means for estimating a position of a magnetic pole.

In addition, a seventh aspect of the invention is directed to the control device for a synchronous motor according to the sixth aspect of the invention, wherein the control device further comprises a speed control device for feeding back the speed estimated by the speed estimating device, thereby carrying out a control of the speed.

Figure 1:
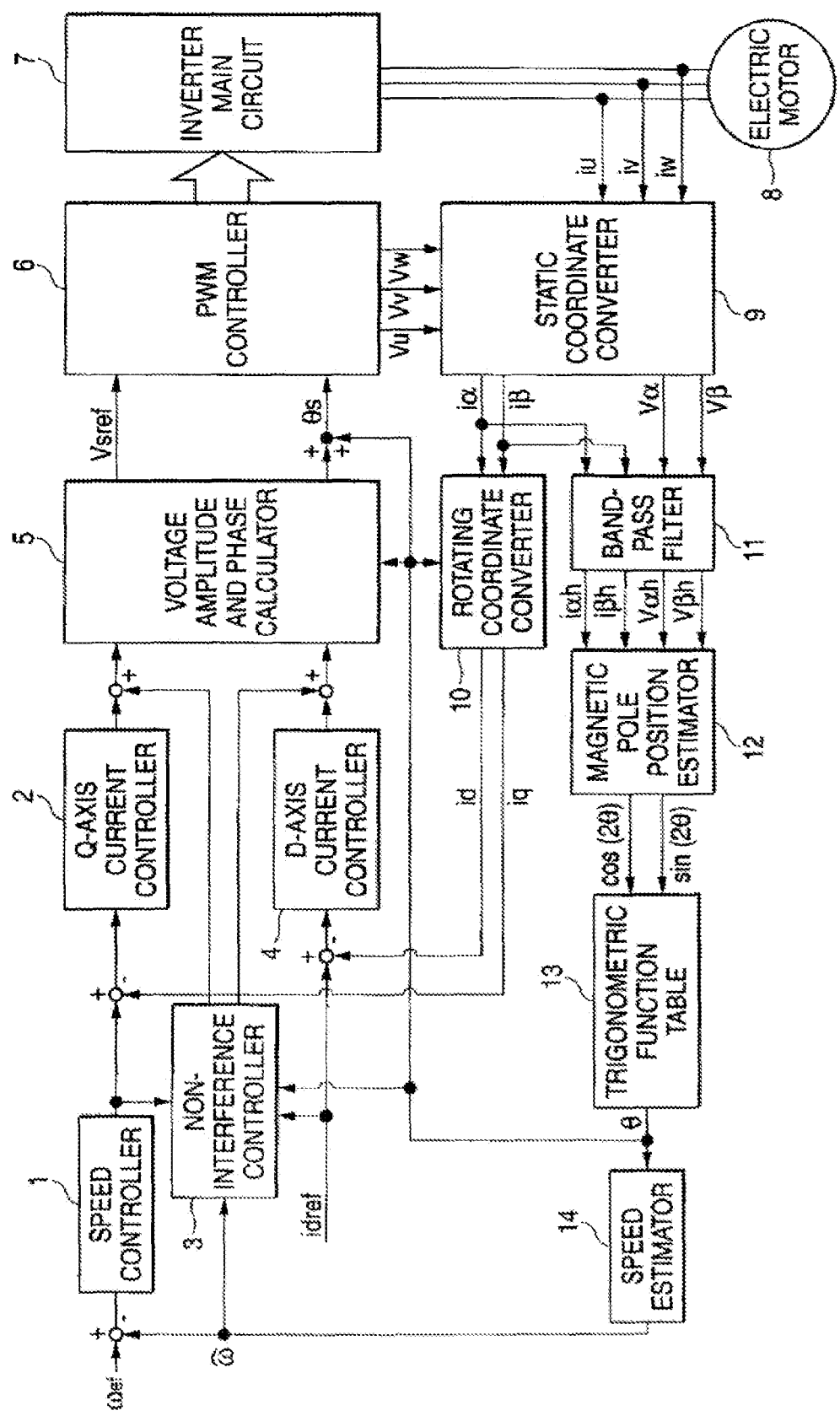
FIG. 1 is a block diagram showing a control device for a synchronous motor according to an embodiment of the invention.

1 speed controller
2 q-axis current controller
3 non-interference controller
4 d-axis current controller
5 voltage amplitude and phase calculator 6 PWM controller
7 inverter main circuit
8 electric motor
9 static coordinate converter
10 rotating coordinate converter
11 band-pass filter
12 magnetic pole position estimator
13 trigonometric function table
14 speed estimator

BEST MODE FOR CARRYING OUT THE INVENTION

According to a control device for a synchronous motor, the invention is based on a method of detecting the position of a magnetic pole by using a current having a carrier frequency component in principle, and a control device having a current controller, a speed estimator and a speed controller is constituted by the system.

First of all, description will be given to the basic principle of the detection of the position of a magnetic pole. In a vector control device for a synchronous motor to be driven by a voltage-operated PWM inverter, a PWM carrier signal is caused to have an arbitrary phase difference between two phases such as UW, VW or WU in three phases of U, V and W, thereby generating a high frequency voltage and a high frequency current which are different from a driving frequency. More specifically, it is possible to regulate the frequency band of a generated high frequency component to have a different frequency from the driving frequency by arbitrarily giving the frequency of the PWM carrier and the phase difference of the carrier. For example, when the phase difference is set to be 120 degrees, voltage and current components having the same frequency as the carrier frequency appear greatly. In this case, the high frequency voltage can be expressed in the following equation:

$$\begin{bmatrix} U_{uh} \\ U_{vh} \\ U_{wh} \end{bmatrix} = \begin{bmatrix} V\sin(\omega_h t) \\ V\sin(\omega_h t - 2\pi/3) \\ V\sin(\omega_h t + 2\pi/3) \end{bmatrix}$$

wherein $U_{uh}$, $U_{vh}$ and $U_{wh}$ represent the high frequency voltages of the U, V and W phases respectively, V represents the amplitude of a high frequency voltage, and $\omega_h$ represents a carrier angular frequency.

Moreover, a relationship between the high frequency voltage and the high frequency current can be expressed in the following equation (1):

$$\begin{bmatrix} U_{uh} \\ U_{vh} \\ U_{wh} \end{bmatrix} = \begin{bmatrix} L_{uu} & L_{uv} & L_{uw} \\ L_{vu} & L_{vv} & L_{vw} \\ L_{wu} & L_{wv} & L_{ww} \end{bmatrix} \frac{d}{dt} \begin{bmatrix} i_{uh} \\ i_{vh} \\ i_{wh} \end{bmatrix} \quad (1)$$

wherein $i_{uh}$, $i_{vh}$ and $i_{wh}$ represent the high frequency currents of the U, V and W phases respectively, L represents an inductance, $L_{uu}$, $L_{vv}$ and $L_{ww}$ represent the self-inductances of the U, V and W phases respectively, and others represent an inductance between the phases. An electric motor using a permanent magnet for a rotor has an electrical salientpole. Therefore, the inductance includes information about the position of a magnetic pole:

$$L_{uv} = -L_{g0}/2 + L_{g2}\cos(2\theta - 2\pi/3)$$

$$L_{vw} = -L_{g0}/2 + L_{g2}\cos(2\theta)$$

$$L_{uw} = -L_{g0}/2 + L_{g2}\cos(2\theta + 2\pi/3)$$

$$L_{uu} = L_s + L_{g0} + L_{g2}\cos(2\theta)$$

$$L_{vv} = L_s + L_{g0} + L_{g2}\cos(2\theta + 2\pi/3)$$

$$L_{ww} = L_s + L_{g0} + L_{g2}\cos(2\theta - 2\pi/3)$$

wherein $L_{g0}$ represents an exciting inductance in an air gap magnetic flux, $L_s$ represents a stator leakage inductance, and $L_{g2}$ represents an inductance with a magnitude depending on an angle.

When the equation (1) is converted into the static coordinate system of a stator reference, the following equation (2) can be obtained:

$$\begin{bmatrix} U_{\alpha h} \\ U_{\beta h} \end{bmatrix} = \begin{bmatrix} L_0 + L_1\cos(2\theta) & L_1\sin(2\theta) \\ L_1\sin(2\theta) & L_0 - L_1\cos(2\theta) \end{bmatrix} \frac{d}{dt} \begin{bmatrix} i_{\alpha h} \\ i_{\beta h} \end{bmatrix} \quad (2)$$

wherein $L0 = L_s + 3Lg0/2$ and $L1 = 3Lg2/2$ are set.

When-magnetic pole position information $\sin(2\theta)$ and $\cos(2\theta)$ are obtained from the equation (2), the following equation (3) can be set. Thus, it is possible to estimate the position of the magnetic pole by using a high frequency voltage and a high frequency current.

$$\begin{bmatrix} \cos(2\theta) \\ \sin(2\theta) \end{bmatrix} = \frac{1}{L_1\left[\left(\frac{d}{dt}i_{\alpha h}\right)^2 + \left(\frac{d}{dt}i_{\beta h}\right)^2\right]} \begin{bmatrix} u_{\alpha h}\frac{d}{dt}i_{\alpha h} - u_{\beta h}\frac{d}{dt}i_{\beta h} - L_0\left[\left(\frac{d}{dt}i_{\alpha h}\right)^2 - \left(\frac{d}{dt}i_{\beta h}\right)^2\right] \\ u_{\alpha h}\frac{d}{dt}i_{\beta h} + u_{\beta h}\frac{d}{dt}i_{\alpha h} - 2L_0\frac{d}{dt}i_{\alpha h}\frac{d}{dt}i_{\beta h} \end{bmatrix} \quad (3)$$

If the estimating mechanism is synchronized with a carrier frequency and the current is sampled when the high frequency current $i_{\beta h}$ reaches a peak, $i_{\alpha h}$ having a phase separated by 90 degrees becomes zero. Therefore, the equation (3) can be expressed more simply in the following equation (4).

$$\begin{bmatrix} \cos(2\theta) \\ \sin(2\theta) \end{bmatrix} = \tag{4}$$

$$\frac{1}{L_1\left(\frac{d}{dt}i_{\beta h}\right)^2}\begin{bmatrix} -u_{\beta h}\frac{d}{dt}i_{\beta h}+L_0\left(\frac{d}{dt}i_{\beta h}\right)^2 \\ u_{\alpha h}\frac{d}{dt}i_{\beta h} \end{bmatrix} = \begin{bmatrix} \dfrac{-u_{\beta h}}{\left(L_1\frac{d}{dt}i_{\beta h}\right)}+L_0 \\ \dfrac{u_{\alpha h}}{\left(L_1\frac{d}{dt}i_{\beta h}\right)} \end{bmatrix}$$

By calculating cos (2θ) and sin (2θ) from the equations (3) and (4) and turning the angle 2θ out of a trigonometric function table prepared in a calculator based on the values to carry out a division by 2, it is possible to estimate a magnetic pole position θ (hereinafter indicated as θ^).

While a current differential value is used for the calculations of the equations (3) and (4), moreover, a current is changed suddenly at a high speed so that the magnetic pole position θ^ is set on an oscillating basis. The current differential value is calculated from the equation (2) based on an equation (5) and both sides are integrated so that an equation (6) is obtained.

$$\frac{d}{dt}\begin{bmatrix} i_{\alpha h} \\ i_{\beta h} \end{bmatrix} = \frac{1}{L_0^2-L_1^2}\begin{bmatrix} L_0-L_1\cos(2\theta) & -L_1\sin(2\theta) \\ -L_1\sin(2\theta) & L_0+L_1\cos(2\theta) \end{bmatrix}\begin{bmatrix} u_{\alpha h} \\ u_{\beta h} \end{bmatrix} \tag{5}$$

$$\begin{bmatrix} i_{\alpha h} \\ i_{\beta h} \end{bmatrix} = \frac{1}{L_0^2-L_1^2}\begin{bmatrix} L_0-L_1\cos(2\theta) & -L_1\sin(2\theta) \\ -L_1\sin(2\theta) & L_0+L_1\cos(2\theta) \end{bmatrix}\begin{bmatrix} \int u_{\alpha h}dt \\ \int u_{\beta h}dt \end{bmatrix} \tag{6}$$

When the magnetic pole position information sin (2θ) and cos (2θ) are obtained from the equation (6) the following equation (7) can be set.

An embodiment of the invention will be described below with reference to the drawings.

FIG. 1 is a block diagram showing the control of a control device for a synchronous motor according to the embodiment of the invention.

Figure 2:
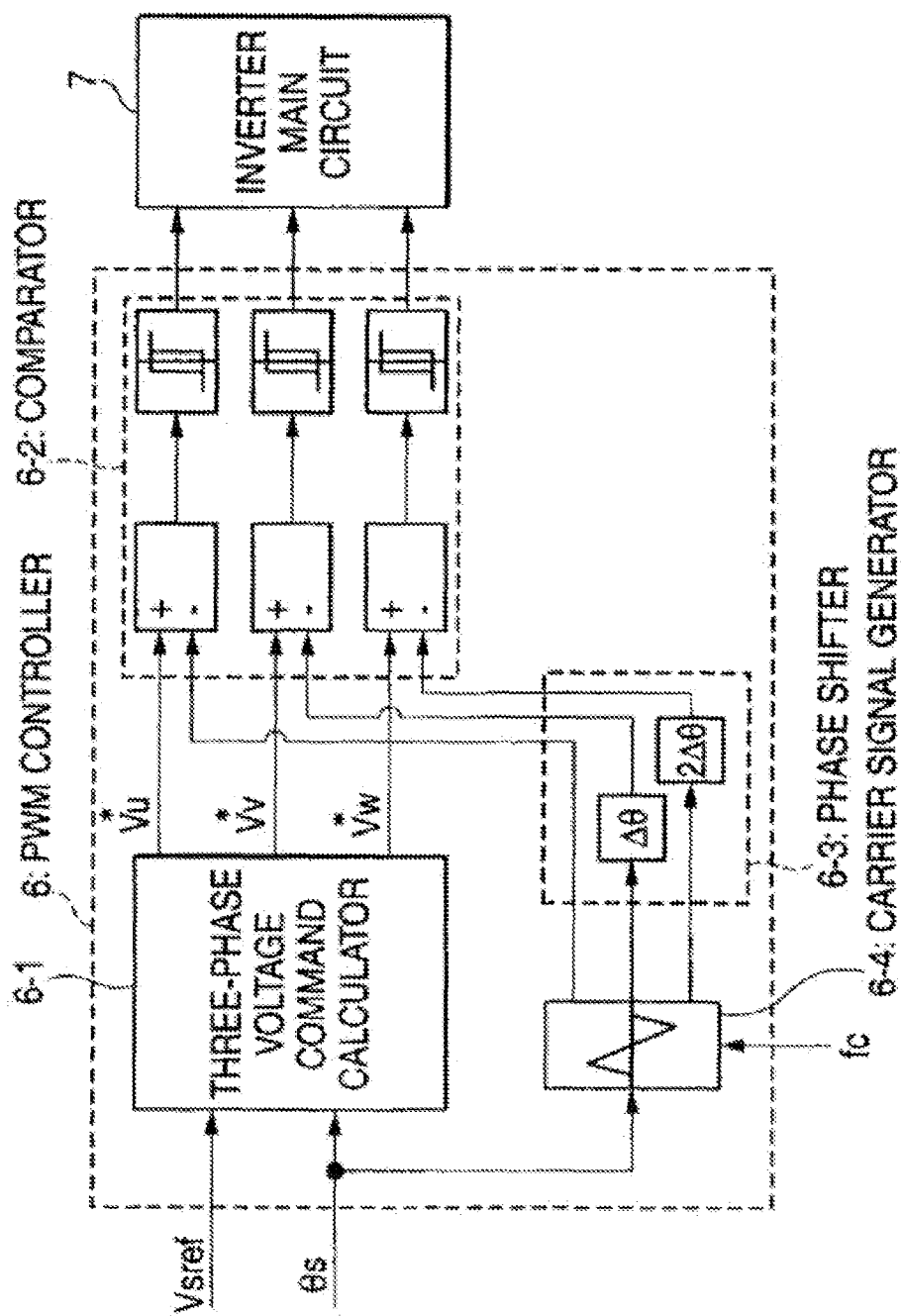
FIG. 2 is a block diagram showing a PWM controller illustrated in FIG. 1.

FIG. 2 is a block diagram showing a PWM controller illustrated in FIG. 1.

In FIG. 1, a speed controller 1 serves to compare a speed command value with a speed estimation value so as to determine a q-axis current (torque current) command isqef in such a manner that a deviation is zero. A q-axis current controller 2 serves to compare iqRef with a current iq which is proportional to a torque in a current converted into a coordinate system to be rotated synchronously with a rotor and to determine a voltage command Vq in such a manner that a deviation is zero.

A q-axis current controller 4 serves to compare idRef with a current id related to the direction of a magnetic pole in the current converted into the coordinate system to be rotated synchronously with the rotor and to determine a voltage command vd in such a manner that a deviation is zero. A non-interference controller 3 serves to calculate speed starting forces interfering with each other between d and q axes and to carry out such a control as to cancel an influence on the current controller. A voltage amplitude and phase calculator 5 serves to input the voltage command values Vd and Vq and to calculate the amplitude and phase of a command voltage vector. A PWM controller 6 serves to input the amplitude and phase of the command voltage vector which are calculated by the voltage amplitude and phase calculator 5 and to generate an inverter switching signal.

FIG. 2 shows the PWM controller 6 for generating an arbitrary high frequency in FIG. 1.

A three-phase voltage command calculator 6-1 serves to input the amplitude and phase angle of a voltage command vector calculated by a vector control device and to calculate a three-phase voltage command value. On the other hand, in $$\begin{bmatrix} \cos(2\theta) \\ \sin(2\theta) \end{bmatrix} = \tag{7}$$

$$\frac{1}{L_1\left(\left(\int u_{\alpha h}dt\right)^2+\left(\int u_{\beta h}dt\right)^2\right)}\cdot\begin{bmatrix} L_0\left(\left(\int u_{\alpha h}dt\right)^2-\left(\int u_{\beta h}dt\right)^2\right)-(L_0^2-L_1^2)\left(i_{\alpha h}\int u_{\alpha h}dt-i_{\beta h}\int u_{\beta h}dt\right) \\ 2L_0\int u_{\alpha h}dt\int u_{\beta h}dt-(L_0^2-L_1^2)\left(i_{\alpha h}\int u_{\beta h}dt+i_{\beta h}\int u_{\alpha h}dt\right) \end{bmatrix}$$

In the case in which a carrier period and a voltage sampling period are synchronized with each other, a voltage integral value is treated as a fixed value as in the following equation.

$\int u_{\alpha h}dt = u_{\alpha h}\Delta t$, $\int u_{\beta h}dt = u_{\beta h}\Delta t$ Δt: sampling time Thus, the frequency, band of a high frequency component generated by arbitrarily giving the carrier frequency of the PWM and the phase difference of the carrier is regulated to have a different frequency from a driving frequency so that the position of a magnetic pole can be estimated based on a relationship between a high frequency voltage and a high frequency current. In this case, an AC signal does not need to be externally superposed at all. Moreover, the position of the magnetic pole is estimated by the frequency band which is not related to the driving frequency. Also in the state of a zero speed, therefore, the estimation can be carried out.

order to generate a different high frequency from the driving frequency, a carrier signal having an arbitrary frequency which is generated in a carrier signal generator 6-4 has a V phase shifted by an angle of Δθ and a W phase shifted by an angle of 2Δθ based on a U phase and they are compared with the voltage command value in a comparator 6-2 so that a switching signal is generated. Then, the switching signal is input to an inverter main circuit 7. Moreover, arbitrary high frequency voltages Vu, Vv and Vw are input to a static coordinate system converter 9 together with detecting currents iu, iv and iw.

For the estimation of the position of the magnetic pole, first of all, a detecting voltage or a command voltage and a detecting current are converted from a three-phase AC signal into a two-phase AC signal in the static coordinate system converter 9 as shown in the equation (2), and only an arbitrary frequency specified by a band-pass filter 11 is extracted.

In a magnetic pole position detector 12, the calculations of the equations (3), (4) and (7) are carried out to obtain cos 2θ and sin 2θ, thereby estimating a magnetic pole position θ based on a trigonometric function table (lookup table) 13. A speed ω is estimated by a speed estimator 14 based on θ thus obtained, thereby controlling the speed controller 1.

While the invention has been described in detail with reference to the specific embodiment, it is apparent to the skilled in the art that various changes and modifications can be made without departing from the spirit and, scope of the invention.

The application is based on Japanese Patent Application (No. 2002-252617) filed on Aug. 30, 2002 and contents thereof are incorporated herein by reference.

INDUSTRIAL APPLICABILITY

As described above, according to the invention, the carrier frequency of a PWM inverter and the phase difference of a carrier are arbitrarily given to implement the estimation of the position of a magnetic pole at an arbitrary frequency which is different from a driving frequency. Consequently, it is possible to produce an advantage that the position of the magnetic pole can be accurately estimated also in the state of a zero speed.

Furthermore, an AC signal does not need to be externally superposed at all. Therefore, it is possible to produce an advantage that a new signal generator does not need to be prepared and a control device for a synchronous motor can be simplified,

The invention claimed is:

1. A control device for a synchronous motor which drives the synchronous motor through a voltage-operated PWM inverter and controls a torque and a speed of the motor, comprising:
   phase difference holding means for causing a PWM carrier signal to have an arbitrary phase difference between two phases such as UV, VW or WU in three phases of U, V and W, high frequency extracting means for extracting a high frequency voltage and a high frequency current which are thus generated from a detecting voltage or a command voltage and a detecting current, and position estimating means for estimating a position of a magnetic flux or a position of a magnetic pole by using said extracted high frequency voltage and said extracted high frequency current.

2. The control device for a synchronous motor according to claim 1, wherein the phase difference holding means generates an arbitrary high frequency on a motor input voltage or current between the two phases such as UV, VW or WU of the inverter, said arbitrary high frequency being other than an output frequency of the voltage-operated PWM inverter.

3. The control device for a synchronous motor according to claim 1, wherein the frequency extracting means converts the three phases of the motor into a two-phase static coordinate system with α axis and β axis being orthogonal by 90 degrees from each other, in which the U phase of the three phases of the motor is set to be the a axis, and detects a voltage and a current having the arbitrary high frequency components on the α and β axes respectively so that only the arbitrary frequency components can be extracted by means of a band-pass filter.

4. The control device for a synchronous motor according to claim 1, wherein the position estimating means for estimating a position of a magnetic pole calculates cos 2θ and sin 2θ by means of a magnetic pole position estimator based on said extracted high frequency voltage component and said extracted current component to obtain a magnetic pole position θ by referring to a trigonometric function table.

5. The control device for a synchronous motor according to claim 1, further comprising a current control device for isolating a detecting current into a directional component of the magnetic pole and a torque component by using the position estimated by the means for estimating a position of a magnetic pole, each being fed back to the current control device respectively so as to control the current.

6. The control device for a synchronous motor according to claim 1, further comprising a speed estimating device for estimating a speed by using the position estimated by the means for estimating a position of a magnetic pole.

7. The control device for a synchronous motor according to claim 6, further comprising a speed control device for feeding back the speed estimated by the speed estimating device, thereby carrying out a control of the speed.

8. A control device for a synchronous motor, comprising:
   a phase shifter operable to cause a PWM carrier signal to have an arbitrary phase difference between two phases such as UV, VW or WU in three phases of U, V and W;
   a band-pass filter operable to extract the high frequency voltage and the high frequency current; and
   a magnetic pole position estimator operable to estimate a position of a magnetic flux or a position of a magnetic pole by using said extracted high frequency voltage and said extracted high frequency current.

9. The control device according to claim 8, wherein arbitrary high frequency on a motor input voltage or current between is generated between the two phases of the inverter, the arbitrary high frequency being other than an output frequency of the voltage-operated PWM inverter.

10. The control device according to claim 8, wherein the three phases of the motor is converted into a two-phase static coordinate system with α axis and β axis being orthogonal by 90 degrees from each other, in which the U phase of the three phases of the motor is set to be the α axis, and a voltage and a current having the arbitrary high frequency components on the α and β axes respectively is detected so that only the arbitrary frequency components can be extracted by a band-pass filter.

11. The control device according to claim 8, wherein the magnetic pole position estimator is operable to estimate a position of a magnetic pole by calculating cos 2θ and sin 2θ based on said extracted high frequency voltage component and said extracted current component to obtain a magnetic pole position θ by referring to a trigonometric function table.

12. The control device for a synchronous motor according to claim 8, further comprising a current control device operable to isolate a detecting current into a directional component of the magnetic pole and a torque component by using the position estimated by the magnetic pole position estimator, each being fed back to the current control device respectively so as to control the current.

13. The control device according to claim 8, further comprising a speed estimating device operable to estimate a speed by using the position estimated.

14. The control device according to claim 13, further comprising a speed control device operable to feed back the speed estimated by the speed estimating device, thereby carrying out a control of the speed.

* * * * *